Aug. 19, 1958   A. H. DE HAAS VAN DORSSER ET AL   2,848,402
PROCESS FOR ELECTRODIALYZING LIQUIDS
Filed Jan. 18, 1956   4 Sheets-Sheet 1
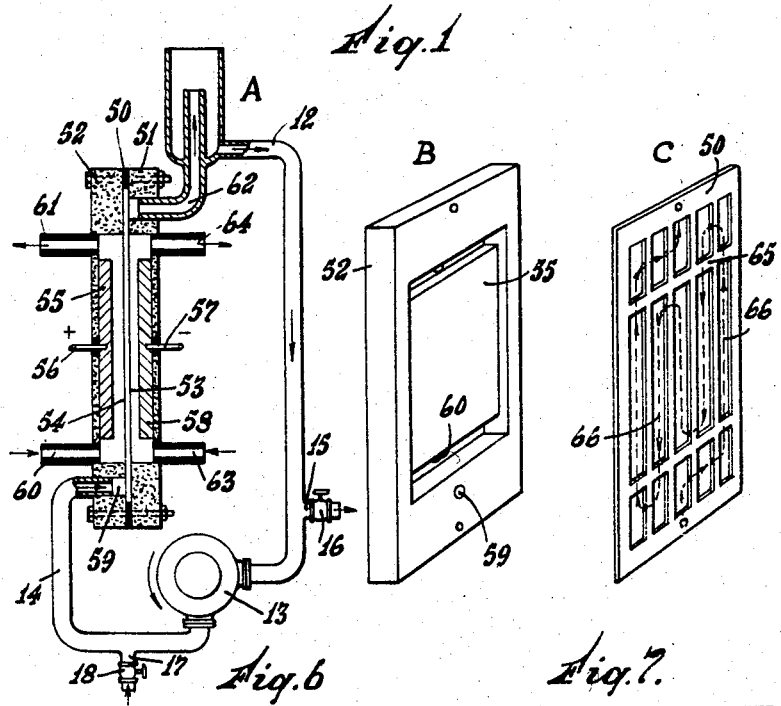
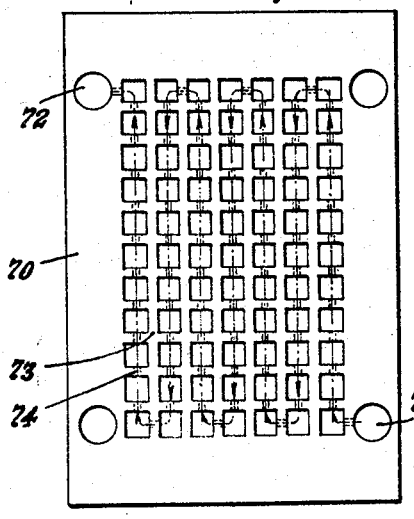
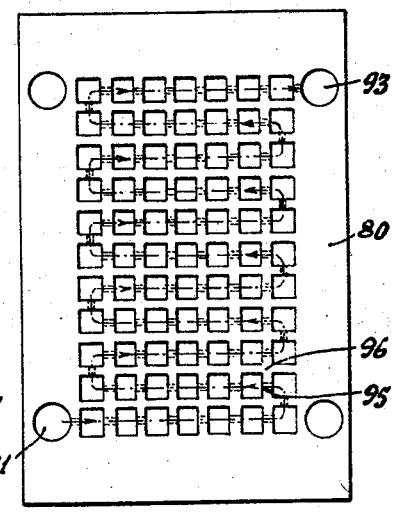
INVENTORS
AREND HUBREGT DE HAAS VAN DORSSER
CORNELIS VAN HOEK
BY
ATTORNEYS

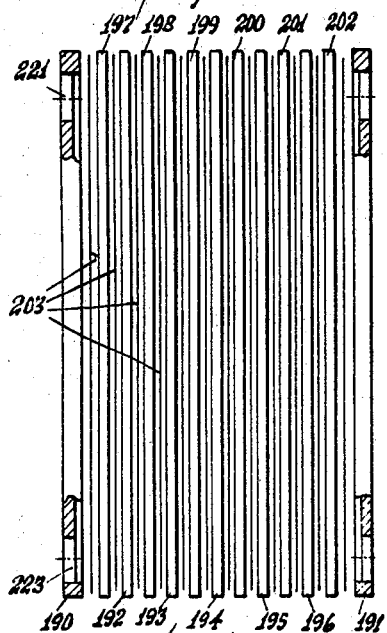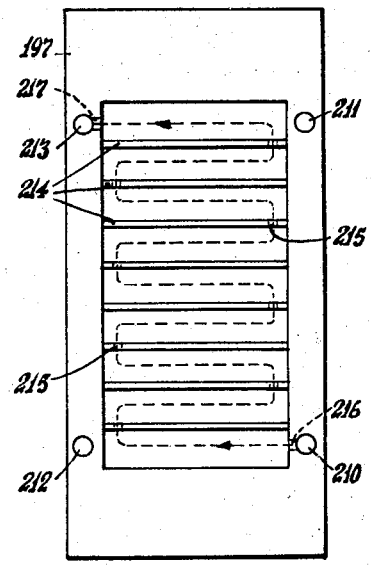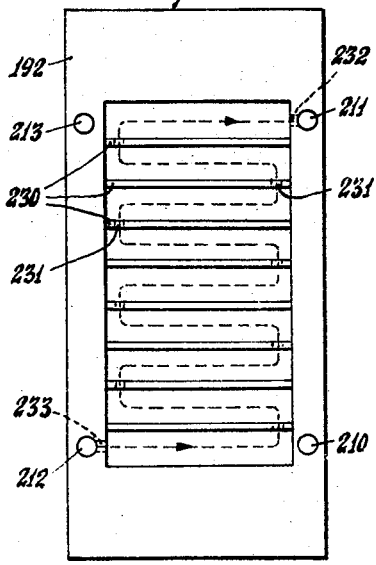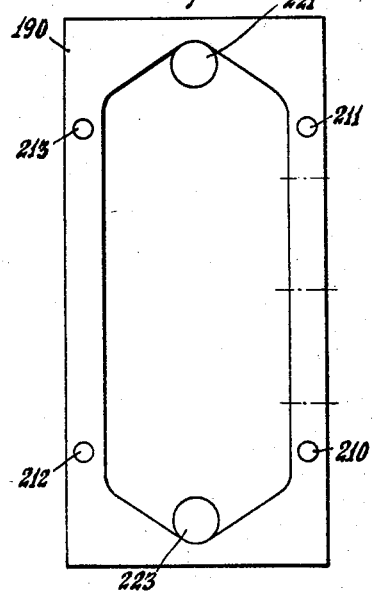

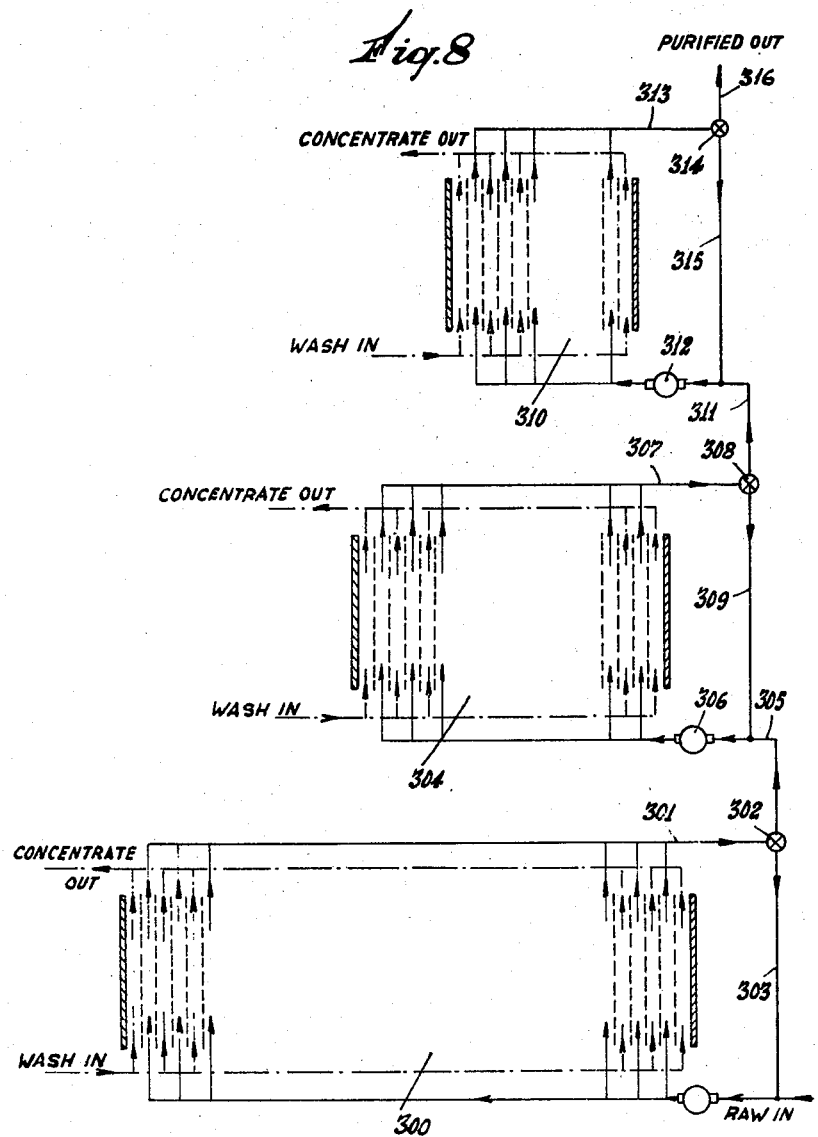

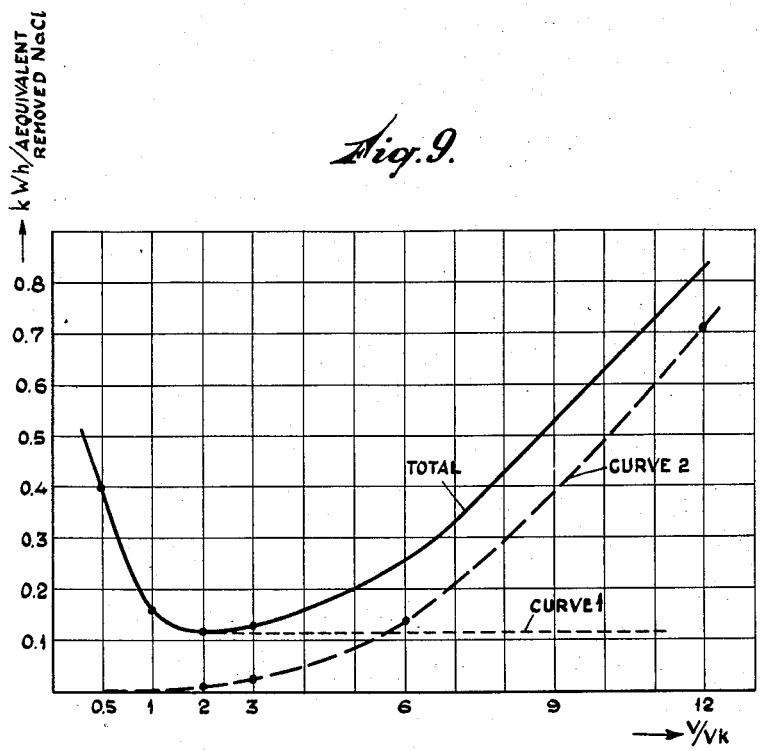

United States Patent Office 2,848,402
Patented Aug. 19, 1958

2,848,402

PROCESS FOR ELECTRODIALYZING LIQUIDS

Arend Hubregt de Haas van Dorsser, The Hague, and Cornelis van Hoek, Wassenaar, Netherlands, assignors to Nederlandse Centrale Organisatie Voor Toegepast-Natuurwetenschappelijk Onderzoek, The Hague, Netherlands, a corporation of the Netherlands Application January 18, 1956, Serial No. 560,031

Claims priority, application Great Britain April 12, 1949

5 Claims. (Cl. 204—151)

This invention relates to apparatus and processes for electrodialyzing liquids, in which electrolytes are continuously removed from a solution by passing this solution through at least one compartment separated from adjacent compartments by ion-permeable membranes and passing a direct current in series across said compartments and membranes. This application is a continuation-in-part of our earlier application, Serial No. 154,096, filed on April 5, 1950, now abandoned.

Apparatus for the electrodialytic demineralization of solutions or for concentrating solutions are known and have been frequently described, e. g. in the U. S. Patent No. 1,840,105 and in a paper by Kurt H. Meyer and W. Strauss in "Helvetica Chimica Acta" 23 (1940), pages 795–800.

It is known that on passing a direct electric current through a membrane in contact with an electrolyte solution polarization effects occur at the surface of the membranes which result in changes in the pH and decrease the concentration of electrolytes in the liquid film adjoining the membrane surface, by which the voltage over the cell is increased; these polarization phenomena are thoroughly discussed in a paper by Erich Manegold and Karl Kalauch, published in "Kolloid Zeitschrift" 86 (1939), pages 313–329.

It is an object of this invention to provide a process of electrodialysis which satisfactorily reduces or avoids the occurrence of such polarization phenomena and which achieves the optimum utilization of electrical energy in the demineralization of electrolyte solutions.

In accordance with the present invention, it has been found that there are certain critical velocities for the flow of solutions treated in an electrodialysis apparatus, at which the treatment of any given solution can be carried out with a very considerable reduction of polarization effects and with a minimum consumption of electrical energy per unit of electrolyte removed from the solution by the electrodialysis. At velocities below these critical velocities the solution treated is subject to local changes of pH and other polarization effects at the faces of the ion-permeable membranes bordering the electrodialysis cell, with attendant objectionable increases of the voltage across the cell and wasteful consumptions of power in order to achieve a given degree of demineralization of the solution. At velocities of the solution above the critical velocities, the requirements of power and equipment for carrying out the process are increased wastefully, without commensurate benefits in the demineralization process.

It has been found that the critical velocities mentioned above are definitely related in any particular case to a certain value of the tension or voltage existing across the electrodialysis cell of the apparatus used. The tension that would exist in the complete absence of polarization effects can be readily calculated. When the velocity of the flow of the electrolyte solution to be demineralized is substantially lower than the critical velocities, the actual tension across the cell is quite high. As the velocity of such flow is increased, the actual tension decreases until a point is reached at which the tension or voltage across the cell amounts to 125% of the calculated tension. The velocity at this point is referred to herein as the "critical depolarization velocity." When that velocity is reached, a very substantial reduction of polarization effects and power consumption is obtained. It has been found that, in general, the critical velocities mentioned above are realized when the actual velocity of the solution flowing through the cell is not less than the "critical depolarization velocity" as here defined nor more than about five times the value of this "critical depolarization velocity."

Accordingly, a process is provided by the present invention which comprises flowing a stream of an electrolyte solution to be demineralized (sometimes called the diluting solution) through an electrodialysis cell in contact with two ion-permeable membranes while flowing a rinsing solution (sometimes referred to as a concentrating solution) in contact with the other side of each of said membranes and passing a direct electric current in series across said membranes and said solutions, and maintaining the flow of the solution to be demineralized at a velocity which is between one and 5 times the value of the "critical depolarization velocity" as herein defined, thus both avoiding polarization phenomena and achieving the optimum utilization of electrical energy. In this way, the electrodialysis process can be carried out consistently with a considerable reduction of local pH changes and other polarization phenomena and with a minimum consumption of electrical energy per unit quantity of electrolyte removed from the diluting solution.

When the electrolyte solution to be demineralized is passed through the diluting cell as a purely laminar flow, which always exists when the pressure drop ($\Delta p$) in the direction of flow is proportional to the velocity, polarization phenomena always occur at the membranes and cause increases in the tension across the cell and pH changes in the boundary layers on the membranes. In some uses of electrodialysis, sedimentations or coagulations of lime or other substances result on the membranes. When the flow of the dialysate is entirely turbulent, as it is when its velocity in a cell of simple geometric configuration is higher than the critical Reynolds number, or when the pressure drop is proportional to the square of the velocity, these polarization phenomena occur not at all or only to a limited extent. On the other hand, the mere existence of turbulent flow in some part or parts of the cell, as indicated by the Reynolds number or by a non-linear relation between the velocity of the solution and the pressure drop ($\Delta p$) in the cell, is not effective to control the polarization phenomena satisfactorily. This is especially the case where the cells used have a complicated geometrical form. It has been found, however, that the polarization phenomena are controlled satisfactorily, whether the cell used is simple or complicated in form, when the velocity of the flow of the solution through the cell is at least as great as the critical depolarization velocity herein defined.

The present invention is especially important for applications of electrodialysis in which narrow electrodialysis cells are employed. In order to maintain a high electrical efficiency in the process, it is important that the distance between the two ion-permeable membranes bordering each electrodialysis cell be considerably less than 10 mm. Preferably it is even less than 3 mm. and in some cases the use of electrodialysis cells having a width of 1 mm. or less is advantageous. In the use of such very narrow cells, there is a pronounced resistance against movement of the liquid in the cell along the faces of the membranes. An entirely turbulent motion of the liquid, though effective to keep the liquid thoroughly mixed, can be obtained only by applying a very great and costly pumping power. According to the present invention, the electrodialysis can be carried out satisfactorily in very narrow cells without resort to entirely turbulent flow of the liquid, yet without trouble from polarization of the liquid and with important savings through the reduction of the power consumed in other ways of operation.

The value of the "critical depolarization velocity" for any particular solution to be treated in any particular electrodialysis apparatus depends upon the geometrical configuration of the electrodialysis cell of the apparatus, the concentration of ions in the solution, and the viscosity and the density of the solution. This value can be determined experimentally for any case by calculating the tension across the cell in the absence of polarization (hereinafter denoted as $\mu\sim$), and determining experimentally the velocity of flow of the solution at which the actual tension across the cell is 125% of the calculated tension ($\mu\sim$).

It has also been found that the value of the "critical depolarization velocity" ($V_k$) for any particular case can be calculated approximately by the use of a formula that applies generally to all cases, subject to deviations of approximately 10% where different apparatuses or widely different current densities or concentrations are employed. We have found the applicable formula to be $$V_k = K \cdot \left(\frac{\varphi \cdot k \cdot \delta}{D \cdot F \cdot c_0}\right)^n \cdot \frac{L}{\delta^2} \cdot \frac{\eta}{C} \quad \text{(Formula I)}$$

wherein:

$\varphi$ = coulomb efficiency
$i$ = current density
$\delta$ = width of the electrodialysis cell
$D$ = diffusion constant of the electrolyte in the solution
$F$ = Faraday
$c_0$ = concentration of electrolyte in the solution
$n$ = an integer approximating 1, which for NaCl proved to be 0.8
$L$ = average length of the unobstructed path of the solution along the membranes in the electrodialysis cell
$\eta$ = viscosity of the solution at the working temperature
$C$ = density of the solution.

The principal quantities governing the values determined by this formula are the current density, the coulomb efficiency, the electrolyte concentration, the width of the cell, and the length of the unobstructed path along the membranes. A high current density ($i$) promotes the transport of ions from the boundary layers at the membranes and thus reduces the ion concentrations in those layers and promotes polarization. The coulomb efficiency ($\varphi$) has the same ultimate influence, for a high coulomb efficiency corresponds to a reduced transportation of anions and cations from the respective rinsing chambers through the membranes into the polarized films of deviating concentration at the membranes in the electrodialysis chamber, and thus tends to decrease the ion concentrations in those films. The higher the salt concentration ($c_0$), the greater is the transport of ions to the boundary layers by diffusion; so increased salt concentrations tend to hamper polarization. The influence of the membrane distance ($\delta$) may be accounted for by its effect upon the extent of motion of the solution in the electrodialysis cell. The length of the unobstructed path along the membranes ($L$) has some influence, since the boundary layers are more exhausted by a longer contact with the membranes in their way through the cell than by a shorter one, if the flow is not entirely turbulent.

The other quantities ($n$, D, F, $\eta$ and C) are of minor importance, for they are constants in any given case, and their values vary only slightly in different cases. These quantities have been included in the formula chiefly in order to obtain a dimensionless proportionality constant K.

Table I below shows the value of K, which has been determined experimentally, in a number of experiments with aqueous sodiumchloride solutions of various concentration, various current densities and various widths of the electrodialysis cell.

The experiments were carried out in a multicell apparatus of the general type described by Kurt H. Meyer and W. Strauss, mentioned herebefore, containing between the anode compartment and cathode compartment 14 membranes, 7 of which were anion selectively permeable and 7 cation selectively permeable, and which were arranged alternatively. The 7 desalting compartments were provided with corrugated perforated sheets of polyvinylchloride, supporting the membranes and in the same time influencing the path of the liquid through the cell. These corrugated sheets increase to some extent the electrical resistance $\mu\sim$, and also the energy for the pumps, but promote the turbulence in the cell, and in fact decrease therefore the energy required for the desalting process.

*Table I*

| Experiment No. | Concentration input in mg. Cl$^-$/l. | Current dens. in mA./cm.$^2$ | Distance between the membranes in mm. | $\mu \sim$ in volts calculated | $V_k$ in cm./sec. (measured) | $\varphi$ | L, cm. | K as calculated from Formula I |
|---|---|---|---|---|---|---|---|---|
| 1 | 20,500 | 100 | 1.6 | 0.39 | 2.55 | 0.9 | 1.5 | 0.42 |
| 2 | 20,500 | 120 | 1.6 | 0.47 | 2.55 | 0.9 | 1.5 | 0.38 |
| 3 | 9,900 | 60 | 1.6 | 0.48 | 2.70 | 0.9 | 1.5 | 0.38 |
| 4 | 9,900 | 100 | 1.6 | 0.81 | 4.00 | 0.9 | 1.5 | 0.38 |
| 5 | 9,900 | 120 | 1.6 | 0.97 | 4.40 | 0.9 | 1.5 | 0.36 |
| 6 | 5,700 | 60 | 1.6 | 0.84 | 4.40 | 0.85 | 1.5 | 0.42 |
| 7 | 5,700 | 100 | 1.6 | 1.40 | 5.55 | 0.85 | 1.5 | 0.36 |
| 8 | 1,100 | 5 | 1.6 | 0.36 | 1.60 | 0.75 | 1.5 | 0.34 |
| 9 | 1,100 | 25 | 1.6 | 1.80 | 6.40 | 0.75 | 1.5 | 0.36 |
| 10 | 355 | 10 | 1.6 | 2.22 | 8.0 | 0.65 | 1.5 | 0.42 |
| 11 | 5,000 | 25 | 1.6 | 0.35 | 3.12 | 0.85 | 1.5 | 0.46 |
| 12 | 1,000 | 10 | 1.6 | 0.71 | 4.36 | 0.75 | 1.5 | 0.42 |
| 13 | 5,000 | 25 | 3.2 | 0.70 | 1.12 | 0.85 | 1.5 | 0.36 |

The wash liquid in the intermediate cells was a solution containing 20,000 mg. NaCl per l. in all the experiments.

Table II on the following page gives the power consumption of the desalting according to experiments Nos. 1, 4, 6 and 10 of Table I, with the values of $V_k$ determined according to Table I and as determined by experiments with other values of the flow velocity. From these data it is apparent that at a considerable increase in the velocity of flow above the value of $V_k$ there is no or substantially no profit as to the power consumption in the demineralization process yet there is a substantial loss of energy in pumps, etc., while a considerable reduction of the velocity below the value of $V_k$ causes a large increase in power consumption.

In Fig. 9 the power, required for removal of one equivalent NaCl from a solution as in Experiment No. 1, is indicated, curve 1 showing the energy required for the electrodialysis and curve 2 the energy required for the energy in pumps, and the curve indicated total showing the total power consumption in kwh. required for removal of one equivalent of NaCl from a solution containing 20,500 mg. Cl/l. in the apparatus used, in relation to the velocity of flow, given as the proportion of the critical velocity.

For any other liquid similar curves can be given of the same general type, but differing to some extent in the exact place of the minimal energy and in the slope of the branches, but generally the velocities between one and 5 times the critical velocity may be used.

If a considerable reduction in electrolyte content is aimed at, the electrolyte solution should be passed through a diluting cell of an electrodialysis apparatus more than once at a velocity which is not less than the critical de-

*Table II*

| Experiment No. | $V/V_k$ | $V$/cm./sec. | Power, kwh./equivalent removed NaCl | |
|---|---|---|---|---|
| | | | for electro-dialysis | for pump |
| 1 | ½ | 1.28 | 0.0407 | 0.00005 |
| 1 | 1 | 2.55 | 0.0151 | 0.00018 |
| 1 | 2 | 5.10 | 0.0121 | 0.00096 |
| 1 | 3 | 7.65 | 0.0121 | 0.00255 |
| 1 | 6 | 15.3 | 0.0121 | 0.0134 |
| 1 | 12 | 30.6 | 0.0121 | 0.0706 |
| 4 | ½ | 2.00 | 0.0718 | 0.0001 |
| 4 | 1 | 4.00 | 0.0315 | 0.0005 |
| 4 | 2 | 8.00 | 0.0252 | 0.0010 |
| 4 | 3 | 12.00 | 0.0252 | 0.0070 |
| 4 | 6 | 24.00 | 0.0252 | 0.037 |
| 4 | 9 | 36.00 | 0.0252 | 0.098 |
| 6 | ½ | 2.20 | 0.0873 | 0.0002 |
| 6 | 1 | 4.40 | 0.0346 | 0.0011 |
| 6 | 2 | 8.80 | 0.0277 | 0.0062 |
| 6 | 3 | 13.2 | 0.0277 | 0.0165 |
| 6 | 6 | 26.4 | 0.0277 | 0.087 |
| 10 | ½ | 4 | 0.277 | 0.007 |
| 10 | 1 | 8 | 0.119 | 0.039 |
| 10 | 2 | 16 | 0.0956 | 0.20 |
| 10 | 6 | 48 | 0.0956 | 0.54 | polarization velocity, to attain a sufficient demineralization. According to our invention this may be accomplished by recycling the electrolyte solution, in which case the stream of the electrolyte solution that has been passed through one electrodialysis apparatus is divided into a first stream, which is added to the stream of electrolyte solution supplied to the one apparatus, and into a second stream, and the quantity of solution in the first stream is kept substantially greater than the quantity of solution in the second stream.

It has been known heretofore to use the stream of electrolyte solution that has been passed through a first electrodialysis apparatus as the supply of a second electrodialysis apparatus, wherein it is treated further, and also to use a plurality of apparatus, the outflow of one being the supply of the next one.

Preferably both methods are combined in such a way, that a stream of electrolyte solution is supplied to a first apparatus, and this stream after being treated in this first apparatus is divided into a first stream, which is added to the stream of electrolyte solution supplied to said apparatus, and a second stream, which is supplied to a second apparatus wherein it is treated further, this second stream after being treated in said second apparatus being divided into a third stream, which is added to the second stream before this stream enters the second apparatus, and a fourth stream which is the treated product.

In some cases, where a considerable increase or decrease of electrolyte content of the solution must be accomplished, a plurality of apparatus may be combined as indicated before for two apparatuses.

Both the electrolyte solution which has to be demineralized and the solution wherein the electrolyte concentration is increased may be recycled in this way, or only one of them.

If it is the object to gain a potable water from seawater, a further quantity of this seawater will generally be used as rinsing liquid. As a rule recycling of the rinsing liquid is not necessary in this case. If, however, it is the object to gain a potable water from a brackish water which is only available in limited quantities, recycling both of that part of the inflow which will be demineralized and of that part which is used as rinsing liquid is recommendable.

The increase in velocity of the solution may be promoted too by providing means which force the solution which is in contact with and is enclosed between two ion-permeable membranes of an electrodialysis cell to follow a long and narrow path which extends from the inlet of a compartment to the outlet of a compartment and which gives rise to the occurrence of local turbulence in the liquid because it has many windings and is locally narrowed, which causes the stream of liquid to change its direction.

Preferably said means are gratings with bars provided with perforations said gratings separating the two ion-permeable membranes as spacers.

However, other separating means for the ion-permeable membranes which promote turbulence of the liquid in the dialysis cells and therefore reduce the formation of polarized films against the membranes, have the same effect. As such can be mentioned corrugated sheets of electrically insulating material, provided with holes, which are disposed between two adjacent membranes in such a way that the corrugations are substantially perpendicular to the direction of flow of the dialysate through the cells.

Similar gratings with bars provided with perforations as in the electrodialysis cells can be placed in the adjacent chambers, which gratings separate the two ion-permeable membranes of each compartment as spacers. In this case each membrane is clenched between two gratings, so that each membrane is held accurately at a fixed position in relation to the adjacent membranes. This makes it possible to decrease the distance between two membranes to values which are much less than those which are commonly applied in electrodialysis apparatus, and which may be less than 0.03 inch, which greatly increases the electrical efficiency of the electrodialysis process.

The bars of the gratings should be provided with perforations or holes, permitting the passage of the electrolyte solution. The unobstructed path of flow of the liquid through the respective compartments can be arranged as desired by the choice of the location of said perforations or holes, and determines so the length L of the unobstructed path of the liquid along the membranes.

These and other objects and features of the invention will be more readily understood and appreciated from the following detailed description of preferred embodiments thereof, selected for the purpose of illustration and shown in the accompanying drawings, in which:

Figure 1 is a representation of a simple embodiment of an electrodialysis apparatus according to this invention.

Figure 2 is a diagrammatic representation of a multicell apparatus according to this invention.

Figure 3 represents a projection of a frame of an electrodialysis cell of Figure 2.

Figure 4 represents a projection of a frame of a concentrating cell of Figure 2.

Figure 5 represents a projection of a frame of an electrode cell of Figure 2.

Figures 6 and 7 represent plan views of various embodiments of frames with gratings for an electrodialysis chamber.

Figure 8 is a diagrammatic representation of three units, each consisting of a multicell apparatus, in series connection for the electrolyte solution to be desalted.

Figure 1A shows a section and Figures 1B and 1C a perspective view of the anode compartment and the electrodialysis compartment respectively, of an embodiment of a very simple electrodialysis apparatus according to the invention. The electrodialysis cell is essentially built up from three frames 50, 51 and 52. Herein 52 forms the anode compartment which is provided with an inlet 60 and an outlet 61 for the anode rinsing liquid, and carrying anode 55, connection 56 being mounted in the wall of the compartment in an insulated and water-tight manner. The ion-permeable membrane 54 is clenched between frame 52 and frame 50, the latter forming the wall of the electrodialysis compartment and being provided with a grating 65 with perforated bars. In Fig. 1C the path, extending from the inlet 59 to the outlet 62 of the electrodialysis compartment is indicated with the dotted lines 66. Ion-permeable membrane 53 separates electrodialysis compartment and cathode compartment and is clenched between frame 50 and frame 51 representing the cathode compartment. This cathode compartment has an inlet 63 and an outlet 64 for the cathode rinsing liquid and a cathode 58 with a connection 57.

In frame 52 the aperture 59 serves for the supply of the electrolyte solution to the electrodialysis compartment and aperture 62 in frame 51 forms the outlet for said solution.

The electrolyte solution which is to be dimineralized circulates through the electrodialysis compartment, conduit 12, pump 13, and conduit 14. Demineralized liquid is continually withdrawn from the apparatus by conduit 15 and valve 16 and fresh electrolyte solution supplied by valve 18 and conduit 17. However, the quantity of liquid which is withdrawn from the apparatus by valve 16 is substantially less than the quantity of liquid which is recycled into the electrodialysis compartment.

Figure 2 represents a projection of the essential elements of a multi cell electrodialysis apparatus, which elements are placed apart in the drawing for the sake of convenience. Reference numeral 190 represents the cathode compartment with the (invisible) cathode, 191 the anode compartment with the (invisible) anode, 192, 193, 194, 195 and 196 represent the concentrating compartments and 197–202 represent the electrodialysis compartments. The ion-permeable membranes 203, which are alternatively anion-selective, and cation-selective, are pressed between two frames when the apparatus is assembled.

Figure 3 is a front view of an electrodialysis compartment, wherein 197 represents the frame, provided with four holes; holes 210 and 213 are connected by perforations 216 and 217 in the frame with the electrodialysis compartment and are for the supply and removal of electrolyte solution, holes 212 and 211 being for the supply and removal of the rinsing liquid of the concentrating compartments. In fame 197 bars 214 with holes 215 are provided which form with the adjacent membranes a long and narrow path for the electrolyte solution, supplied by hole 210 and removed by hole 213.

Figure 4 is a front view of a concentrating compartment with frame 192, bars 230, provided with perforations 231 and four holes for the supply and removal of electrolyte solution and rinsing liquid 210–213 as in Figure 3. In the frames of this type the holes 212 and 211 are connected with the compartment by perforations 232 and 233.

Figure 5 is a view of the cathode compartment 190, which is also provided with the four holes 210–213, and which has, besides, apertures 223, and 221 for the supply and removal of the cathode rinsing liquid.

Figures 6 and 7 are views of other embodiments of the frames with gratings which may be used in an electrodialysis compartment according to the invention. In these figures, the frames are indicated by 70, and 80 respectively, the gratings by 73 and 96, the perforations in the gratings by 74 and 95 respectively. The inlet for the liquid is provided at the lower side of the frame and indicated with 71 in Figure 6 and with 81 in Figure 7; the outlet is provided at the upper side and indicated with 72 and 93.

In Figure 8 a raw liquid, e. g. sea water, is fed into the electrodialysis unit 300 and purified in this multiple electrodialysis cell between alternate anion-selective and cation-selective membranes. The partly demineralized water is withdrawn from the unit by conduit 301 and by valve 302 divided into a first stream, which is recirculated by conduit 303 and mixed with raw supply and again supplied to apparatus 300, and into a second stream which is supplied to unit 304 by conduit 305 and pump 306. In this second unit, in which partly demineralized liquid is fed, the tension on each electrodialysis cell is higher than in the first unit, and therefore it contains less cells, so that the same overall tension can be applied to it as to unit 300. After further demineralization in this second unit, the liquid is withdrawn by conduit 307 and by valve 308 divided into a third stream, which is circulated by conduit 309 and mixed with the second stream, and into a fourth stream which is supplied to a third unit 310 by conduit 311 and pump 312.

The dialysate fed into this third unit has a lower concentration and a higher resistance as the second stream, and therefore the resistance is still higher, so that this unit contains less cells than unit 304. After further demineralization in this third unit, the liquid is withdrawn by conduit 313 and by valve 314 divided into a fifth stream, which is circulated by conduit 315 and mixed with the fourth stream, and into a sixth stream, which is the purified product, and which is withdrawn by conduit 316.

We claim:
1. In a process for electrodialyzing an electrolyte solution, wherein a stream of said solution is flowed continuously between and in contact with two ion-permeable membranes while a stream of rinsing liquid is flowed over the other side of each of said membranes and a direct current is passed in series across said membranes through said solution to electrodialyze said solution, the steps which comprise dividing the electrodialyzed liquid issuing from between said membranes into a first stream and a second stream, said first stream containing a substantially greater quantity of liquid than said second stream, continuously adding said first stream to the aforesaid stream of said solution, and maintaining the flow of the resulting liquid between said membranes at a velocity sufficient to prevent polarization effects at the surfaces of said membranes.

2. A process for electrodialyzing an electrolyte solution, which comprises flowing a stream of said solution between and in contact with two ion-permeable membranes while maintaining said membranes spaced apart at a distance of less than 20 mm., simultaneously flowing a stream of a rinsing liquid to and over the other side of each of said membranes and passing a direct current in series across said membranes through said solution to electrodialyze said solution, dividing the stream of electrodialyzed liquid issuing from between said membranes into a first stream and a second stream, said first stream containing a substantially greater quantity of liquid than said second stream, continuously adding said first stream to the aforesaid stream of said solution, and maintaining the flow of the resulting liquid between said membranes at a velocity sufficient to prevent polarization effects at the surfaces of said membranes.

3. In a process as described in claim 2, dividing the stream of rinsing liquid discharged from contact with each of said membranes into two streams one of which contains a substantially greater quantity of liquid than the other, and continuously adding said one stream of discharged rinsing liquid to the original stream of rinsing liquid flowing to the membrane.

4. A process as described in claim 3, wherein said electrolyte solution and said rinsing liquid are of substantially the same composition.

5. A process for electrodialyzing an electrolyte solution with a plurality of electrodialyzing units, which comprises in each unit flowing a stream of electrolyte solution between and in contact with two ion-permeable membranes, simultaneously flowing a stream of a rinsing liquid to and over the other side of each of said membranes and passing a direct current in series across said membranes through said solution to electrodialyze said solution, dividing the stream of electrodialyzed liquid issuing from between said membranes of each of said units into a first stream and a second stream, said first stream from each unit containing a substantially greater quantity of liquid than said second stream therefrom, adding said first stream from each unit to the aforesaid stream of said solution flowing into the same unit and maintaining the flow of the resulting liquid between the membranes of the same unit at a velocity sufficient to prevent polarization effects at the surfaces of such membranes, flowing said second stream from each but the last of said units to the next unit as the aforesaid stream of said solution, and taking off said second stream from the last of said units as the electrodialyzed product.

References Cited in the file of this patent

UNITED STATES PATENTS

| | | |
|---|---|---|
| 1,986,920 | Cross | Jan. 8, 1935 |
| 2,127,791 | Stevens et al. | Aug. 23, 1938 |
| 2,571,247 | Huebotter | Oct. 16, 1951 |

FOREIGN PATENTS

| | | |
|---|---|---|
| 394,360 | Germany | Apr. 26, 1924 |
| 689,674 | France | June 2, 1930 |

UNITED STATES PATENT OFFICE
CERTIFICATE OF CORRECTION

Patent No. 2,848,402                                          August 19, 1958

Arend Hubregt de Haas van Dorsser et al.

It is hereby certified that error appears in the printed specification of the above numbered patent requiring correction and that the said Letters Patent should read as corrected below.

Column 8, line 48, for "20 mm." read -- 10 mm. --; line 68, for the claim reference numeral "3" read -- 2 --.

Signed and sealed this 20th day of January 1959.

(SEAL)
Attest:

KARL H. AXLINE                                             ROBERT C. WATSON
Attesting Officer                                         Commissioner of Patents